United States Patent [19]

Rittenbach

[11] 4,292,635

[45] Sep. 29, 1981

[54] SIGNAL PROCESSING SYSTEM

[75] Inventor: Otto E. Rittenbach, Neptune, N.J.

[73] Assignee: The United States of America as represented by the Secretary of the Army, Washington, D.C.

[21] Appl. No.: 122,217

[22] Filed: Feb. 19, 1980

Related U.S. Application Data

[63] Continuation-in-part of Ser. No. 973,356, Dec. 26, 1978, Pat. No. 4,219,812.

[51] Int. Cl.[3] ........................ G01S 13/52; G06G 7/78

[52] U.S. Cl. ................................ 343/5 NQ; 364/458

[58] Field of Search ..................... 364/458; 343/5 NQ

[56] References Cited

U.S. PATENT DOCUMENTS 3,422,430 1/1969 Rittenbach ............................. 343/9

4,231,005 10/1980 Taylor, Jr. ....................... 343/5 NQ

*Primary Examiner*—Malcolm F. Hubler

*Attorney, Agent, or Firm*—Nathan Edelberg; Jeremiah G. Murray; Michael C. Sachs

[57] ABSTRACT

A signal processing system using balanced processing which involves separating the upper and lower sideband components of a modulation that exists, for example, in a return radar doppler signal, as a result of the motion of scatters and subtracting them.

6 Claims, 2 Drawing Figures

ANTENNA
CIRCULATOR
RF MODULATOR
PULSE GENERATOR
SENSITIVITY TIME CONTROL
RF GENERATOR
RF DEMODULATOR
RF PHASE SHIFTER
PULSE DELAY LINE
PULSE FREQUENCY BANDPASS
PULSE DEMODULATOR
REFERENCE FREQUENCY GENERATOR
FREQUENCY BANDPASS
REFERENCE FREQUENCY PHASE SHIFTER
QUADRATURE BROADBAND SIGNAL
IN-PHASE BROADBAND SIGNAL
MULTIPLIER
COHERENT INTEGRATOR
SUBTRACTOR
NONCOHERENT INTEGRATOR
THRESHOLD DETECTOR
TO RANGE DISPLAY

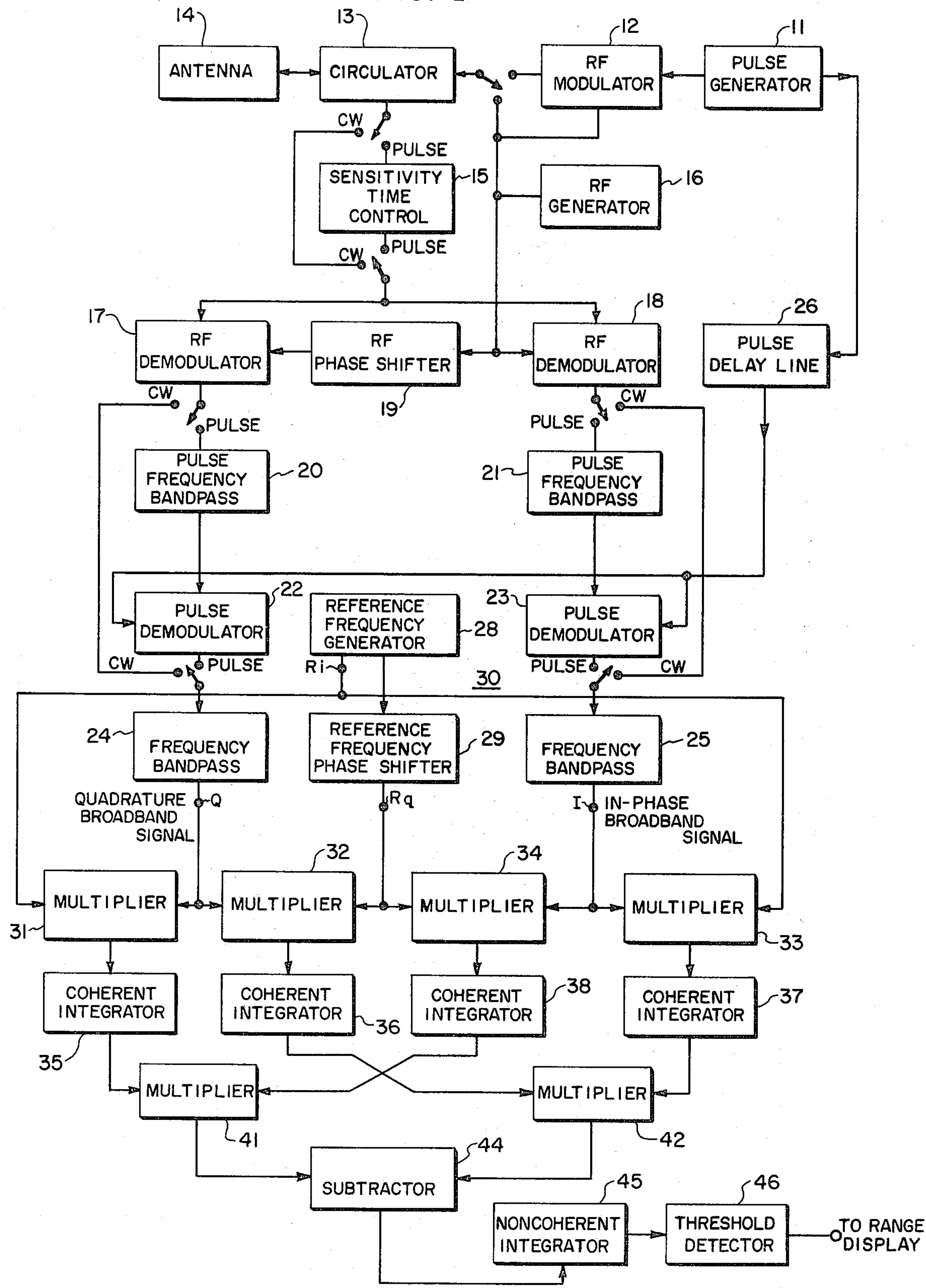
FIG. 1
ANTENNA
14
CIRCULATOR
13
RF MODULATOR
12
PULSE GENERATOR
11
CW
PULSE
SENSITIVITY TIME CONTROL
15
RF GENERATOR
16
CW
PULSE
RF DEMODULATOR
17
RF PHASE SHIFTER
19
RF DEMODULATOR
18
PULSE DELAY LINE
26
CW
PULSE
PULSE
CW
PULSE FREQUENCY BANDPASS
20
PULSE FREQUENCY BANDPASS
21
PULSE DEMODULATOR
22
REFERENCE FREQUENCY GENERATOR
28
PULSE DEMODULATOR
23
CW
PULSE
Ri
30
PULSE
CW
FREQUENCY BANDPASS
24
REFERENCE FREQUENCY PHASE SHIFTER
29
FREQUENCY BANDPASS
25
QUADRATURE BROADBAND SIGNAL
Q
Rq
I
IN-PHASE BROADBAND SIGNAL
MULTIPLIER
31
MULTIPLIER
32
MULTIPLIER
34
MULTIPLIER
33
COHERENT INTEGRATOR
35
COHERENT INTEGRATOR
36
COHERENT INTEGRATOR
38
COHERENT INTEGRATOR
37
MULTIPLIER
41
MULTIPLIER
42
SUBTRACTOR
44
NONCOHERENT INTEGRATOR
45
THRESHOLD DETECTOR
46
TO RANGE DISPLAY

SIGNAL PROCESSING SYSTEM

GOVERNMENT LICENSE

This invention may be manufactured by or for the Government for governmental purposes without the payment of any royalties thereon or therefor.

This application is a continuation-in-part of parent application Ser. No. 973,356 of Otto E. Rittenbach entitled "A Range-Gated Pulse Doppler Radar System", filed Dec. 26, 1978, now U.S. Pat. No. 4,219,812.

TECHNICAL FIELD

Broadly speaking, this invention relates to signal processing. More particularly, this invention relates to a balanced doppler radar signal processing system which involves separating the upper and lower sideband components of modulation that exist in the return radar signal resulting from motion of scatterers and subtracting these separated components.

BACKGROUND OF THE INVENTION

In doppler radar systems, it often is necessary to obtain information which indicates the presence or absence of a moving target—often mixed with clutter—in each doppler frequency resolution cell, that is, for each narrow band of doppler frequencies.

Each moving target in a dopler radar system is represented by a single side band doppler signal corresponding to its radial speed. An upper sideband would be obtained for an approaching target and a lower sideband for a receding target. Doppler signal returns owing to scatterers, for example, wind-driven foliage in a forest or jungle would have an oscillatory motion, and the doppler frequency returns, if integrated over a sufficient time interval, would have substantially equal energy in both sidebands.

In order to cancel the energy in both sidebands to reduce the effect of returns from such scatterers, a system was developed by Otto Rittenbach and described in U.S. Pat. No. 3,422,430, issued Jan. 14, 1969. Such a system, while useful for doppler returns over a broad band of frequencies, does not lend itself well to applications requiring high doppler resolution for low doppler frequencies, unless one were to incorporate narrow band low frequency filters in the system of U.S. Pat. No. 3,422,430. However, it is difficult to construct such narrow band low pass filters.

SUMMARY OF THE INVENTION

In order to circumvent the need for such low frequency narrow band pass filters, applicant has derived a novel balanced doppler signal processing circuit which includes a reference oscillator and an accompanying quadrature phase shifter and wherein the reference oscillator output and the quadrature phase shifted reference oscillator outputs are suitably multiplied with the in-phase and quadrature broad band doppler signals.

The invention and its mode of operation will be more fully understood from the following detailed description when taken with the appended drawings, in which:

DESCRIPTION OF THE DRAWINGS

FIG. 1 is block schematic diagram illustrating a doppler radar system incorporating a preferred embodiment of a balanced doppler radar signal processor.

DETAILED DESCRIPTION OF INVENTION

Figure 2:
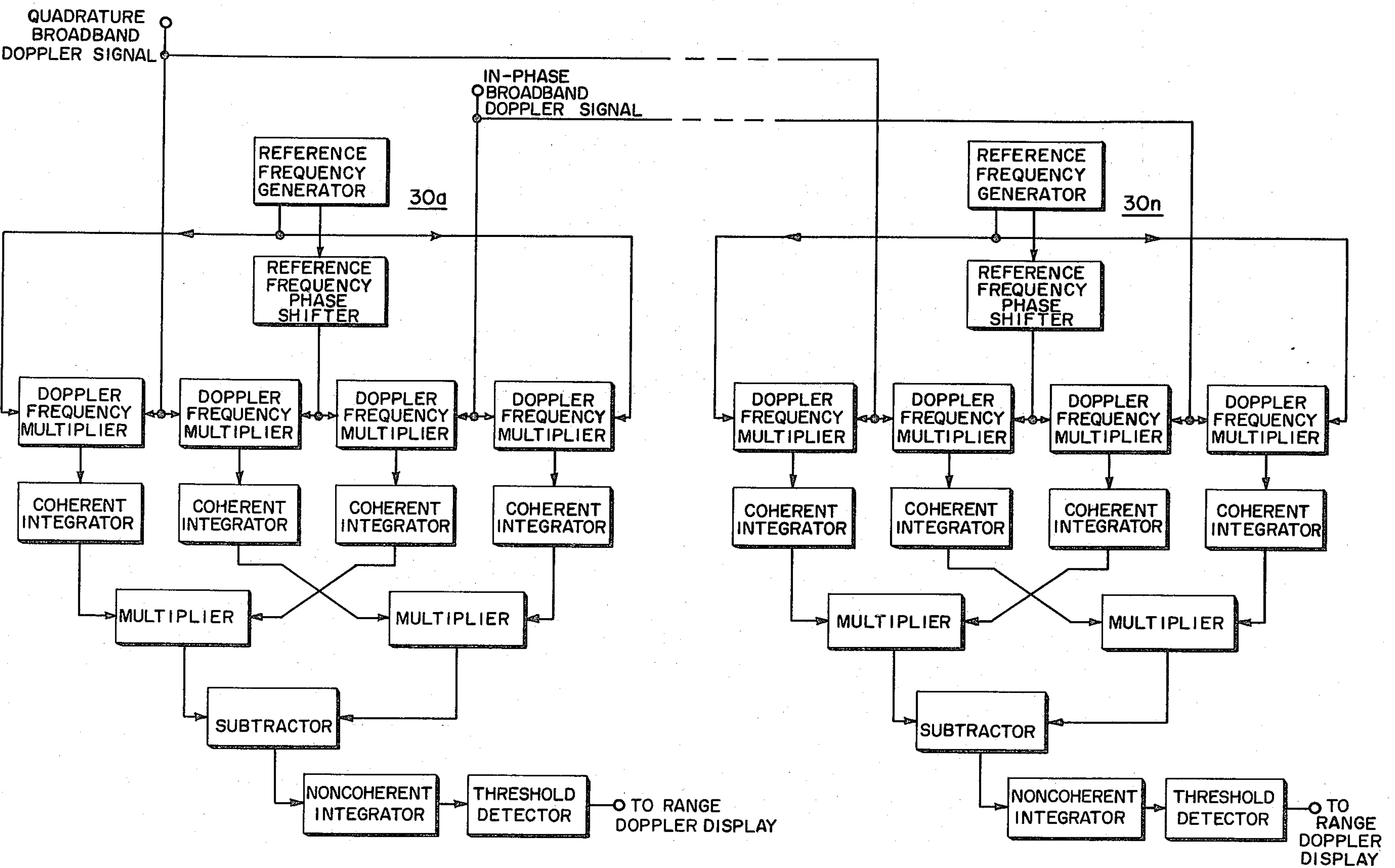
FIG. 2 is a block diagram indicating an extension of the balanced doppler radar signal processor of FIG. 1 for use in applications requiring processing over a plurality of narrow doppler frequency bands.

The radar system of FIG. 1, which includes the balanced signal processor, can be used for either a CW or pulse radar; the circuit changes necessary for each mode of operation can be accomplished by the switches shown in FIG. 1.

In the case of pulse radar, the output of pulse generator 11 is applied to rf modulator 12. The modulated output is then coupled by way of a circulator 13 to antenna 14. The radar signal, after reflection from targets and clutter within a selected region of interest, is received by antenna 14 and returns by way of circulator 13 to a sensitivity time control circuit 15 which serves to correct for decrease of signal strength with distance according to the well known fourth power law. In the case of CW radar, the rf generator 16 supplies a CW signal by way of circulator 13 to the antenna 14; in this mode, the sensitivity time control circuit 15 is bypassed. In either case, the received energy is applied as an input to a quadrature (Q) rf demodulator 17 and to an in-phase (I) rf demodulator 18. The output of the rf generator 16 is directly applied to the other input circuit of the in-phase rf demodulator 18 and is applied through a ninetydegree rf phase shifter 19 to the other input of the quadrature rf demodulator 17.

In the case of pulse operation, the output of the Q and I rf demodulators 17 and 18 are coupled by way of respective Q and I pulse frequency bandpass filters 20 and 21 to respective Q and I pulse demodulators 22 and 23. The components 20, 21 and 22, 23 are unnecessary for CW operation and can be bypassed by the appropriate switches shown in FIG. 1. In the case of pulse operation, the outputs of the Q and I pulse demodulators 22 and 23, respectively, which receive a delayed pulse from pulse delay line 26, are coupled to Q and I frequency band pass filters 24 and 25. In the case of CW operation, the outputs of the Q and I of demodulators 17 and 18 are coupled directly to the respective Q and I frequency band pass filters 24 and 25. The outputs of bandpass filters 24 and 25 appear at terminals Q and I, respectively, as indicated in FIG. 1. Those terminals are the quadrature and in-phase input terminals of the signal processor system 30. The quadrature broadband signal at terminal Q can be represented as $\mp\sin(\omega t\pm\Phi+\phi)$ and the in-phase broadband signal at terminal I can be represented as $\cos(\omega t\pm\Phi+\phi)$ where $\omega$ is the low radian frequency amplitude modulation of the oscillatory clutter at the echo area, $\phi$ is the angle of said modulation and $\Phi$ is the rf phase, which is related to the echo delay time. The derivation of phase expressions can be found in the aforesaid parent application, provided that a pulse or CW function is substituted for the code function set forth in the parent application.

The remainder of the description is applicable to either CW or pulse operation. A reference frequency generator 28 provides a reference output 2 cos $\omega t$ at terminal Ri; and a phase shifted reference output 2 sin $\omega t$ appears at the output terminal Rq of reference frequency phase shifter 29 which serves to shift the phase of the output at terminal Ri by ninety degrees. These + and − signs in the expressions for the Q and I outputs at terminals Q and I represent sidebands corresponding to incoming and outgoing direction of travel of oscillatory targets such as wind-driven foliage.

The outputs at terminals Q and Ri are multiplied in the $Q_i$ frequency multiplier 31 and the outputs at terminals Q and Rq are multiplied in the $Q_q$ frequency multiplier 32. Similarly, the outputs at terminals I and Ri are multiplied in the $I_i$ frequency multiplier 33 and the outputs at terminals I and Rq are multiplied in the $I_q$ frequency multiplier 34. The outputs of the $Q_i$, $Q_q$, $I_i$ and $I_q$ channel multipliers 31, 32, 33 and 34 are as shown below.

| | |
|---|---|
| $Q_i$ channel: | $\mp \sin(\omega t + \Phi + \phi) \cdot 2 \cos\omega t$ |
| | $= \mp \sin(2\omega t + \Phi + \phi) + \sin(+ \Phi + \phi)$ |
| $Q_q$ channel: | $\mp \sin(\omega t + \Phi + \phi) \cdot 2 \sin\omega t$ |
| | $= \pm \cos(2\omega t + \Phi + \phi) + \cos(+ \Phi + \phi)$ |
| $I_i$ channel: | $\cos(\omega t \pm \Phi + \phi) \cdot 2 \cos\omega t$ |
| | $= \cos(2\omega t \pm \Phi + \phi) + \cos(\pm \Phi + \phi)$ |
| $I_q$ channel: | $\cos(\omega t \pm \Phi + \phi) \cdot 2 \sin\omega t$ |
| | $= \sin(2\omega t \pm \Phi + \phi) + \sin(\mp \Phi - \phi)$ |

The coherent $Q_i$, $Q_q$, $I_i$ and $I_q$ integrators 35, 36, 37 and 38 eliminate the higher beat frequencies so that the first term of each of the previous 4 sets of equations can be neglected. The integrated outputs are then as follows:

| | | |
|---|---|---|
| $Q_i$ channel: | $\mp \sin(\pm \Phi + \phi)$ | (Integrator 35) |
| $Q_q$ channel: | $\mp \cos(\pm \Phi + \phi)$ | (Integrator 36) |
| $I_i$ channel: | $\cos(\mp \Phi + \phi)$ | (Integrator 37) |
| $I_q$ channel: | $\sin(\mp \Phi - \phi)$ | (Integrator 38) |

The integrated outputs from $Q_i$ integrator 35 and $I_q$ integrator 38 are multiplied in multiplier 41 to provide an output $$\mp\sin(\pm\Phi+\phi)\sin(\mp\Phi-\phi)$$

Similarly, the integrated outputs from $Q_q$ integrator 36 and $I_i$ integrator 37 are multiplied in multiplier 42 to provide an output $$\mp\cos(\pm\Phi+\phi)\cos(\pm\Phi+\phi)$$

The outputs of the $Q_i \times I_q$ multiplier 41 and the $Q_q \times I_i$ multiplier 42 are subtracted by balanced subtractor 44 to provide two outputs $$[\mp\sin(\pm\Phi+\phi)\cdot\sin(\mp\Phi-\phi)]-[\mp\cos(\pm\Phi+\phi)\cdot\cos(\pm\Phi+\phi)]=\mp 1$$

which corresponds to the following two equations:

$$[-\sin(+\Phi+\phi)\sin(-\Phi-\phi)]-[-\cos(\Phi+\phi)\cos(\Phi+\phi)=-1$$

$$[\sin(-\Phi+\phi)\sin(\Phi-\phi)]-[\cos(-\Phi+\phi)\cos(-\Phi+\phi)]=1$$

For oscillatory clutter those will be equal minus and plus components, resulting in zero output; for a unidirectional moving target, the output from subtractor 44 will be processed without attenuation. In order to provide an output over many Nyquist samples, the output from subtractor 44 is applied to a noncoherent integrator 45. The detected output from threshold detector 46 can then be applied to a suitable range doppler display for displaying any target which lies within the designated range.

In many practical doppler radars, it is convenient to divide the total range into several doppler frequency bands or to distinquish between targets of different radial velocity ranges. In such cases, a plurality of signal processing means 30*a* to 30*n* is used, as indicated in FIG. 2.

The processing system described need not be restricted to doppler radar signals but can be used to process any combination of single side band and double side band signals. In such a case, the output of the subtractor 44 would be ±1 in the case of a single side band signal and 0 for double side band signals.

It should be noted that the system can also be used for digital processing, provided, of course, that sampling at the Nyquist rate is used at the terminals Q, I, and Ri and that the sampling rate is slower than the speed of operation of the multipliers and integrators.

Digital multipliers are available which are often much faster in operation than multipliers required for certain types of signal processing. For example, if the Nyquist rate requires one multiplication per millisecond at any of the multipliers of FIGS. 1 or 2, a fast multiplier performing one multiplication per microsecond could replace up to 1000 of the multipliers shown in FIGS. 1 or 2, using a commutation scheme, such as electrical switches or shift registers, for switching the fast multiplier to the proper multiplier inputs and outputs.

What is claimed is:

1. A signal processing system responsive to at least one in-phase broadband signal and to at least one quadrature broadband signal in phase quadrature with said in-phase broadband signal, said processing system including at least one signal processor, each of said signal processors including a reference frequency generator for providing a reference frequency output of a frequency lying within a predetermined portion of said signal band width, a reference frequency phase shifter coupled to said reference frequency generator for providing a quadrature reference signal, first quadrature means for multiplying said quadrature broad band signal and said reference frequency output, second quadrature means for multiplying said quadrature broad band signal and said quadrature reference frequency output, first in-phase means for multiplying said in-phase broad band signal and said quadrature reference frequency output, second in-phase means for multiplying said in-phase broad band signal and said reference frequency output, a coherent integrator coupled to each of said multipliers, means for cross-multiplying the outputs of the integrators coupled to said first quadrature means for multiplying and to said first in-phase means for multiplying, means for cross-multiplying the outputs of the integrators coupled to said second quadrature means for multiplying and to said second in-phase means for multiplying, and a subtractor connected to the outputs of said first and second multiplying means.

2. A signal processing system according to claim 1 wherein each of said signal processors further includes a noncoherent integrator and threshold detector in the output of said subtractor.

3. A signal processing system according to claim 1 comprising a plurality of signal processors and wherein the reference frequency generator for each processor provides a reference signal of unique frequency.

4. A signal processing system according to claim 2 comprising a plurality of signal processors and wherein the reference frequency generator for each processor provides a reference signal of unique frequency.

5. A signal processing system according to claim 1 wherein each of said signal processors is receptive of doppler radar signals of a given range of radial velocities.

6. A signal processing system according to claim 4 wherein each of said signal processors is receptive of doppler radar signals of a given range of radial velocities.

* * * * *